United States Patent
Forbes et al.

(10) Patent No.: US 6,978,090 B1
(45) Date of Patent: Dec. 20, 2005

(54) OPTICAL NETWORK ARCHITECTURE

(75) Inventors: Duncan J Forbes, Bishop's Stortford (GB); Peter Dyke, Saffron Walden (GB); Michael P Dyer, Stansted (GB)

(73) Assignee: Nortel Networks Limited, St. Laurent (CA)

(*) Notice: Subject to any disclaimer, the term of this patent is extended or adjusted under 35 U.S.C. 154(b) by 583 days.

(21) Appl. No.: 09/629,785

(22) Filed: Jul. 31, 2000

(51) Int. Cl.[7] .............................................. H04B 10/20
(52) U.S. Cl. ........................... 398/59; 398/82; 398/83; 398/85; 398/79; 398/58; 398/70; 398/71; 398/72; 398/3; 398/4; 398/5; 385/24; 385/39; 385/43; 385/15; 370/401; 370/403; 370/404; 370/406; 370/451; 370/452
(58) Field of Search ............... 398/59, 82, 83, 398/85, 66, 67, 68, 70, 71, 72, 79, 3, 4, 5, 398/9, 58; 385/24, 39, 43, 15; 370/401, 403, 370/404, 406, 451, 452

(56) References Cited

U.S. PATENT DOCUMENTS

| | | | | |
|---|---|---|---|---|
| 5,058,206 A | * | 10/1991 | Born et al. ................... | 398/55 |
| 5,136,666 A | * | 8/1992 | Anderson et al. ............. | 385/24 |
| 5,898,801 A | * | 4/1999 | Braun et al. .................. | 385/24 |
| 6,023,359 A | * | 2/2000 | Asahi ............................ | 398/5 |
| 6,160,932 A | * | 12/2000 | Huang et al. ................. | 385/24 |
| 6,288,809 B1 | * | 9/2001 | Touma et al. ............... | 359/125 |
| 6,414,768 B1 | * | 7/2002 | Sakata et al. ............... | 359/119 |
| 2001/0024542 A1 | * | 9/2001 | Aina et al. | |

FOREIGN PATENT DOCUMENTS

EP              631405 A1 * 12/1994 .................. 359/119

* cited by examiner

*Primary Examiner*—Hanh Phan
(74) *Attorney, Agent, or Firm*—Barnes & Thornburg LLP

(57) ABSTRACT

A communications network having two complementary optical networks each connectable to a headend, each optical network comprising a plurality of periodic interleaving filters serially connected by optical waveguides such that an output port of one periodic interleaving filter is couple to an input port of another periodic interleaving filter, and wherein an input or output node of the network is formed by a non-serially connected input or output port of a periodic interleaving filter.

8 Claims, 5 Drawing Sheets

OPTICAL NETWORK ARCHITECTURE

FIELD OF THE INVENTION

The present invention relates to optical communications networks, and particularly though not exclusively to an optical network ring topology especially suitable for metro access.

BACKGROUND OF THE INVENTION

Optical communications networks are typically arranged into either tree or ring architectures. Both architectures are well known and are generally employed in different circumstances. Ring architectures are typically employed in long haul or trunk routes where circuit protection is important. Because the network is arranged into a ring, a break in the ring fibre can be overcome by re-routing traffic around the ring in the opposite direction. This arrangement is more expensive as it requires additional fibre and switching complexity, but provides the protection required where large numbers of calls would otherwise be affected. Tree architectures are also well known and tend to be used in access networks where protection is less critical and reduced deployment costs are more important.

Currently the high cost of ring topology metro access networks is hampering deployment in this network space. However tree architectures, while cheaper to deploy, offer no protection and are therefore unsuitable for metro access networks. Prior art ring topologies in the metro access space typically utilise dielectric filters connected to two headends by sections of optical fibre. Each wavelength or channel on the connecting fibres can be tapped at each filter which may be connected to a large customer such as a bank for example, or to a local access tree network for example. Filters tend to be expensive and also relatively high loss thereby reducing the maximum diameter of the ring in a passive network.

SUMMARY OF THE INVENTION

It is an object of the present invention to provide an improved or at least alternative optical network architecture. It is a further object of the present invention to provide an improved or at least alternative ring topology metro access optical network architecture.

In a first aspect the present invention provides a communications network for connecting a number of customer nodes with a headend, the network comprising:

two optical networks each comprising a plurality of splitters or couplers serially connected by optical waveguides such that an output port of another splitter/coupler is coupled to an input port of another splitter/coupler, and wherein an input or output for each said customer nodes is formed by a non-serially connected input or output port of a said splitter or coupler from each said fibre network.

Preferably each optical network comprises a plurality of serially connected splitters for outgoing traffic and a complementary plurality of serially connected couplers for incoming traffic.

Preferably the splitters and couplers are periodic interleaving filters.

Preferably wherein the filters are fused fibre couplers.

Preferably two of said serially connected splitters or couplers are co-located.

Preferably the optical waveguide is an optical fibre.

In a second aspect the present invention provides a communications network for connecting a number of customer nodes with a headend, the network comprising:

two optical networks each comprising a plurality of splitters or couplers serially connected by optical waveguides such that an output port of one splitter/coupler is coupled to an input port of another splitter/coupler, and wherein an input or output for a said customer node is formed by a non-serially connected input or output port of a said splitter or coupler;

wherein the two optical networks together form a ring architecture.

DETAILED DESCRIPTION OF THE DRAWINGS

The present invention will now be described with reference to the following drawings, by way of example only and without intending to be limiting, in which.

DETAILED DESCRIPTION

Figure 1:
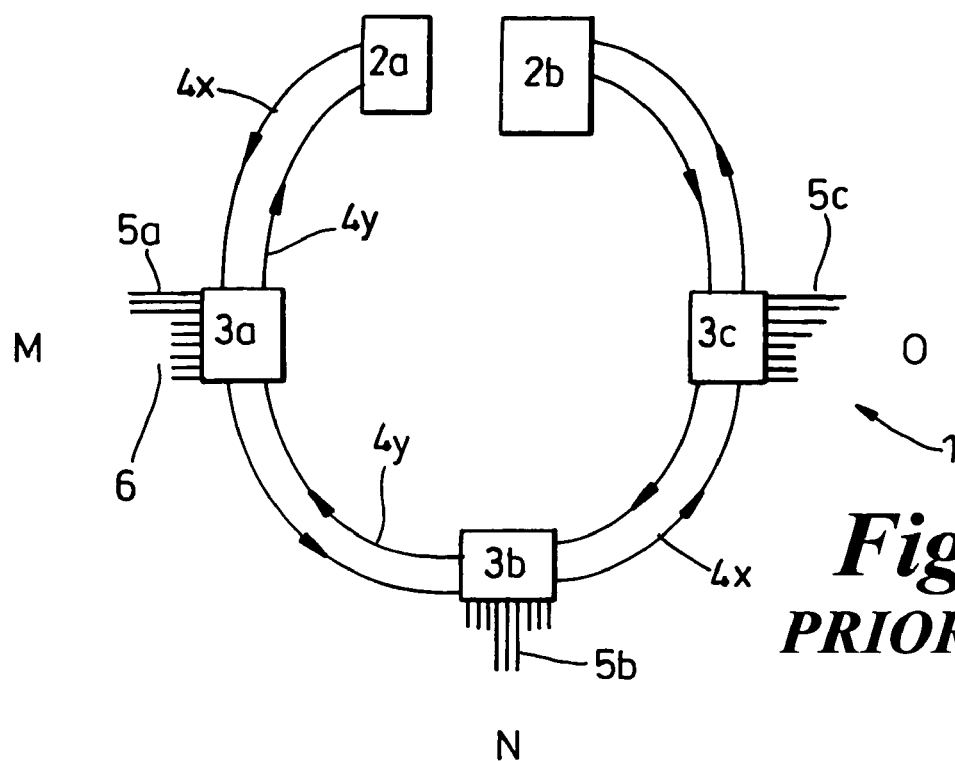
FIG. 1 is a prior art metro access network having a ring architecture.

FIG. 1 shows a prior art optical broadband coupler network 1 arranged into a ring architecture. The network comprises two headends, exchanges or central offices 2a and 2b which direct signals around the ring comprising optical fibre 4 and filter elements 3. The headends 2a and 2b send and receive signals on predetermined channels on the optical fibre 4 of the network 1. The headends 2a and 2b co-operate and couple the network 1 to an external network such as a backbone or carrier network for example. Where the headends 2a and 2b are co-located they effectively operate as a single logical headend unit 2. In the example of FIG. 1, a first fibre ring 4x carries a number of channels in a WDM transmission system, the signals going via filter elements 3a, 3b, and 3c respectively and onto the second headend 2b. A second fibre ring 4y is included from headend 2b via filter elements 3c, 3b and 3a, and onto headend 2a. In practice the first ring 4x and the second ring 4y are implemented in the same physical optical fibre using bi-directional channels. Each filter element is arranged to pass wavelengths from one section of the fibre 4 to another, and in addition to filter off or pass some of the channels to one or more output ports 5. Each filter element 3a, 3b and 3c will typically be arranged to filter off different channels at nodes M, N and O respectively. These nodes may be connected to for example a major customer such as a bank or another network such as a local access network, a LAN or other private network for example. In the event of failure between a pair of nodes any traffic which is using ring 4x to travel to headend 2a can be re-directed to travel via ring 4y to headend 2b, thereby restoring connection to the headends 2a or 2b.

As mentioned above, the filter elements 3 implemented here result in signal loss through the elements. This has implications for passive networks, the cumulative loss restricting the maximum physical size or radius of the network.

Figure 2:
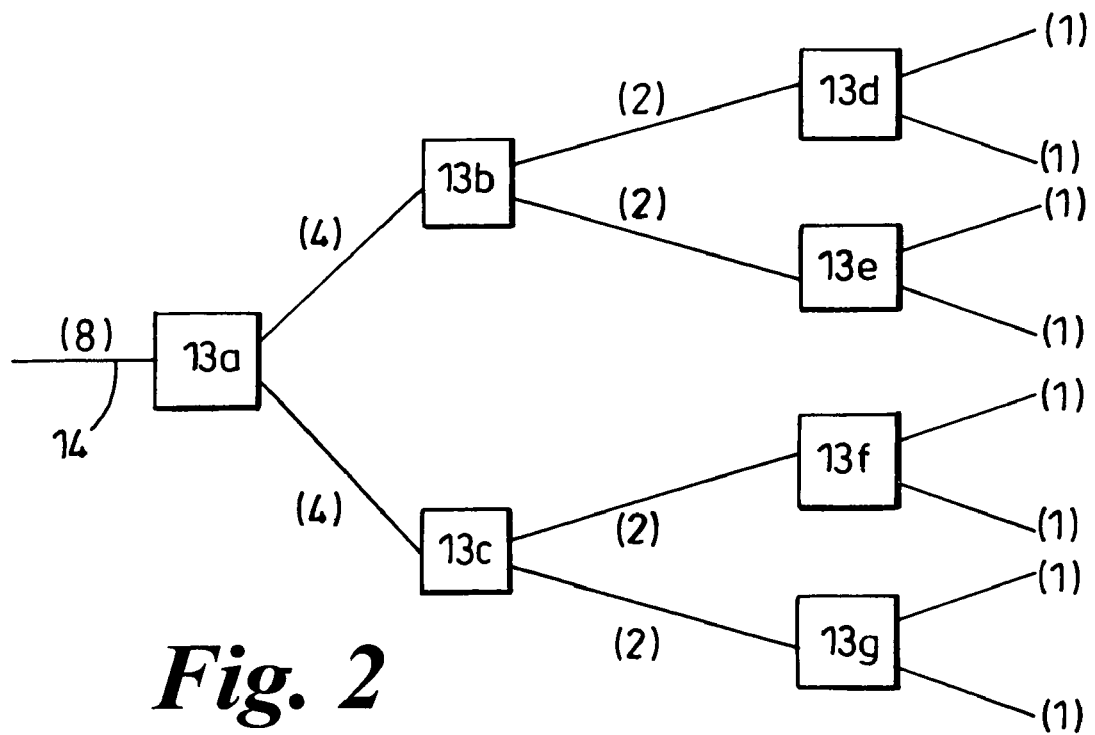
FIG. 2 shows a prior art multiplexer having a tree architecture.

FIG. 2 shows a prior art tree architecture for a multiplexer or network which might typically be applied in an access network environment. The network utilises splitters 13 such as fused fibre couplers for example. These splitters 13 split the incoming channels in two such that in the tree structure a single channel is eventually derived at the output ports of 13d, 13e, 13f and 13g. In FIG. 2, the number in brackets represents the number of channels in each section of fibre 14.

Figure 3:
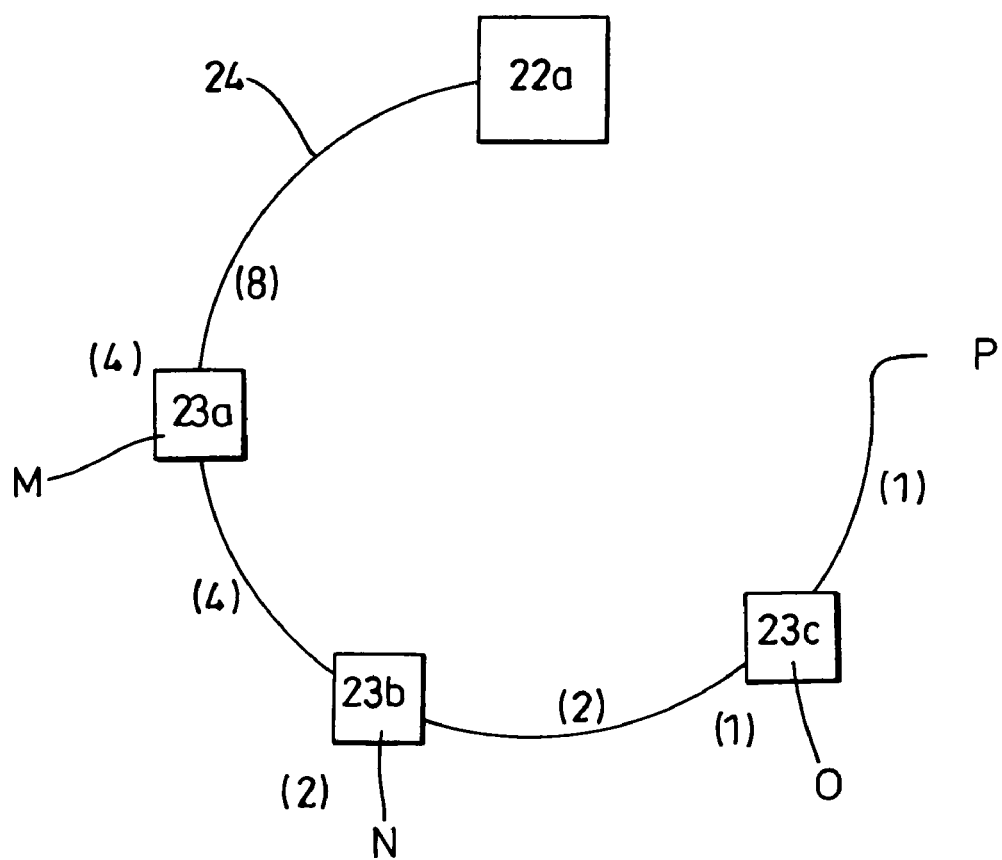
FIG. 3 shows a modified optical network architecture according to the present invention, in which the protection circuits are not shown.

FIG. 3 shows an optical fibre network forming one half of a network having a ring circuit type architecture according to the present invention and which has been implemented using splitters 23 analogous to those used in the tree architecture of FIG. 2. The second ring or fibre network is not shown for ease of explanation. Headend 22a has the same function as the prior art headends described above merely being reconfigured to send and receive channels on the modified architecture of the network of FIG. 3 and feeds optical fibre network 24 with eight channels (the figure in brackets). The signal is split by splitter 23a, four channels being diverted off at node M to a large customer such as a bank or internet service provider, or to a further network such as a local access tree network. The other channels are fed to a further splitter 23b, half of these being fed to node N and the other half further round the ring to splitter 23d. One of the channels from splitter 23d is fed off at node O, the other is fed further round the ring to node P.

The splitting arrangement of the splitters 23 in the architecture of FIG. 3 is similar to that of the splitters 13 in FIG. 2. The splitter series 13a, 13b and 13d in FIG. 2 is analogous to serially connected splitters 23a, 23b and 23d in FIG. 3.

This shown architecture provides low loss routes for wavelengths around the network in contrast to the prior art which concentrates on providing flexible access for wavelengths at the cost of increasing loss. This allows the radius or physical size of the ring structure in FIG. 3 to be larger in a passive network than a comparable system having the architecture of FIG. 1.

The splitters 23 are preferably periodic interleaving filters, such as fused fibre couplers, which are considerably cheaper than the filter elements of the prior art ring circuit in FIG. 1, typically dielectric filter elements. This architecture provides low loss routes for wavelengths around the network in contrast to the prior art which concentrates on providing flexible access for wavelengths at the cost of increasing loss. This allows the radius or physical size of the ring structure in FIG. 3 to be larger in a passive network than a comparable system having the architecture of FIG. 1.

Periodic interleaving filters are known and have complementary periodic frequency responses at their two input/output ports. Channels or bands having wavelengths $\lambda 1$, $\lambda 2$, $\lambda 3$, and $\lambda 4$ entering the periodic interleaving filter at an input port X are split on exiting the filter between its two output ports Y and Z. (The filter may also have a further input port W). The frequency response corresponding to port Y is periodic and is designed such that attenuation is at a minimum at wavelengths $\lambda 1$ and $\lambda 3$, and at a maximum at wavelengths $\lambda 2$ and $\lambda 4$. Channels corresponding to wavelengths $\lambda 1$ and $\lambda 2$ are therefore passed out at port Y while channels corresponding to wavelengths $\lambda 2$ and $\lambda 4$ are not passed. The frequency response through port Z is complementary to that of port Y and is such that only channels corresponding to wavelengths $\lambda 2$ and $\lambda 4$ pass out of port Z. Periodic interleaving filters are symmetrical such that wavelengths fed into the Y port for example, can be split between the W and X ports in the same way that wavelengths through port X (or W) can be split between the Y and Z ports as described above. Reference is made to applicant's co-pending application U.S. Ser. No. 09/559,854 for a more detailed description of these filters, the contents of which are hereby incorporated. Therefore these filters can be used as both splitters and couplers. A preferred implementation of these filters utilise fused fibre couplers which are relatively inexpensive.

Figure 4:
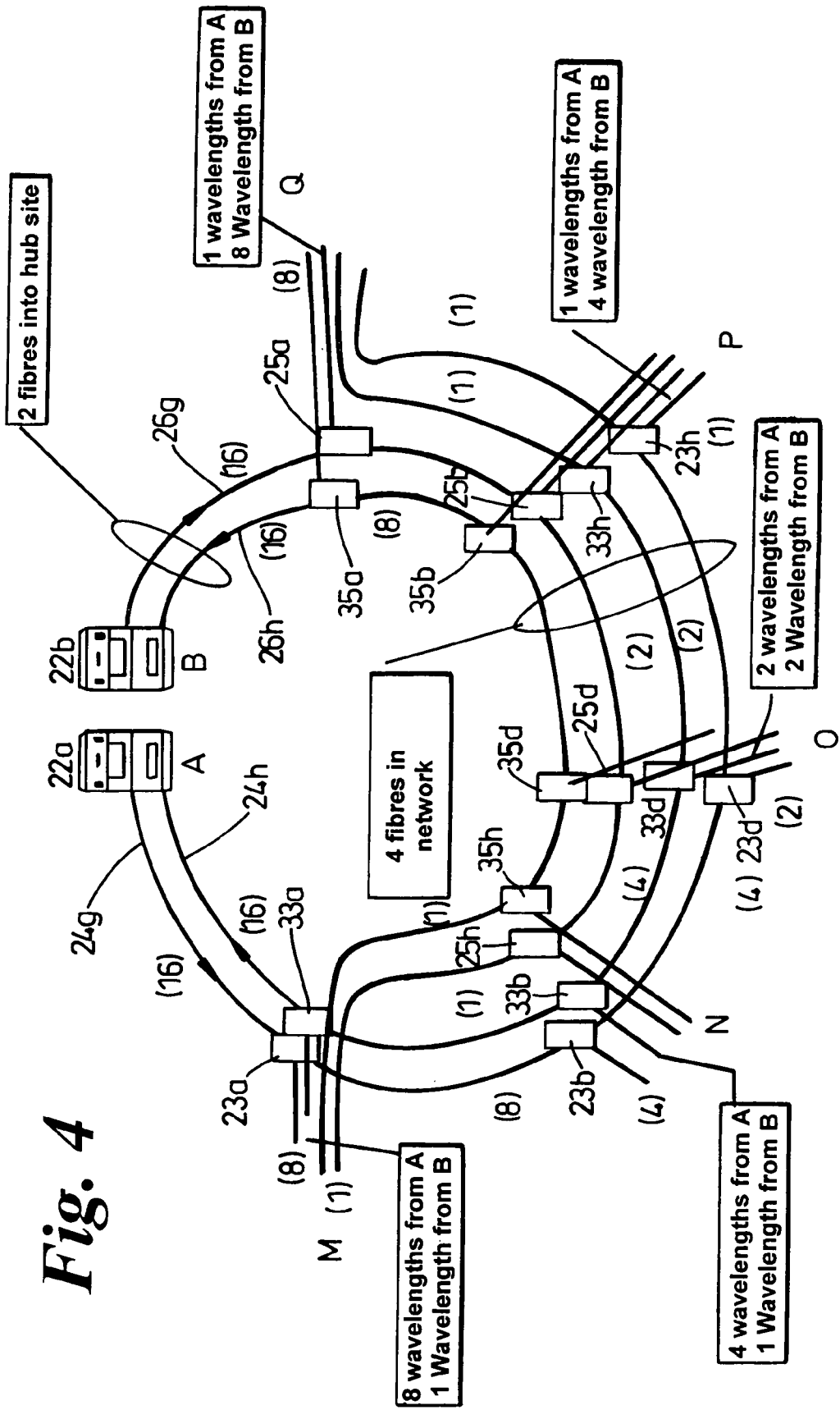
FIG. 4 shows a second preferred embodiment network architecture including protection circuits.

FIG. 4 shows a network having a modified ring type architecture according to a first preferred embodiment of the present invention. The network comprises two headends 22a and 22b, and a number of splitters 23 connected into the optical or fibre network architecture shown by optical fibre 24. Headend 22a provides a signal comprising sixteen downstream (eminating from the headend) channels on fibre 24g which are split at splitter 23a, eight channels being outputted at node M. The remaining eight channels are split at splitter 23b, four channels being drawn off at node N, the remaining four channels going around the optical network to splitter 23d. Two of these channels are drawn off at node O, and the remaining two channels are connected around the fibre network to splitter 23h where one channel is drawn off at node P while the other channel is sent further around the fibre network to node Q. Note that the number in brackets represents the number of channels in each section of fibre 24 and 26.

In a symmetrical duplex arrangement using couplers 33 for upstream or counter propagating channels (towards the headend), a single channel is input at node Q along the fibre network to coupler 33h which also inputs a channel from node P. An output of coupler 33h is connected to the input of coupler 33d further around the fibre network, which also inputs two channels from node O. The multiplexed output of coupler 33d (which comprises four channels) is fed around the fibre network to coupler 33b which also receives four channels from node N. The multiplexed output of coupler 33b (comprising eight channels) is fed around to coupler 33a, which also receives an input from node M comprising eight channels. The multiplexed output of coupler of 33a (comprising sixteen channels) is then fed around the optical network to headend 22a via fibre 24h.

The above described optical network comprising headend 22a, fibres 24g and 24h, splitters 23a, 23b, 23d, and 23h, and couplers 33h, 33d, 33b, and 33a, provides a network having sixteen outgoing channels split between nodes M,N,O,P, and Q, and sixteen incoming channels from these same nodes. In particular, node M comprises eight outgoing and eight ingoing channels, node N comprises four outgoing and four ingoing channels, node O comprises two outgoing and two ingoing channels, node P comprises 1 outgoing and 1 ingoing channel and similarly node Q comprises 1 outgoing and 1 ingoing channel.

Preferably the splitters 23 and the couplers 33 are both fused fibre couplers. These couplers are low cost and therefore provide for a ring architecture network having a feasible deployment cost for metro access applications. In an alternative arrangement the splitters 23 and couplers 33 are implemented as planer waveguide couplers. It will be appreciated that other optical devices known to those skilled in the art could also be used for the splitters and couplers. Fibres 24g and 24h may in practice be implemented in a single bi-directional fibre 24, corresponding splitters 23 and couplers 33 being implemented in the same physical element.

The upstream and downstream channels in fibres 24g and 24h respectively correspond to headend 22a and are complimented by a symmetrical arrangement from headend 22b which is connected to a second fibre network 26. Headend 22b provides a signal comprising sixteen outgoing channels on fibre 26g which are split at splitter 25a, eight channels being outputted at node Q. The remaining eight channels are split at splitter 25b, four channels being drawn off at node P, the remaining four channels going around the fibre network to splitter 25d. Two of these channels are drawn off at node O, and the remaining two channels are connected around the optical network to splitter 25h where one channel is drawn off at node N, while the other channel is sent further around the fibre network to node M.

The symmetrical arrangement also uses couplers 35 for incoming channels on fibre 26h. A single channel is input at node M along the fibre network to coupler 35h which also inputs a channel from node N. Coupler 35h is connected to the input of coupler 35d further around the fibre network, which also inputs two channels from node O. The multiplexed output of coupler 35d (which comprises four channels) is fed around the fibre network to coupler 35b which also receives four channels from node P. The multiplexed output of coupler 35b (comprising eight channels) is fed around to coupler 35a, which also receives an input from node Q comprising eight channels. The multiplexed output of coupler of 35a (comprising sixteen channels) is then fed around the fibre network to headend 22b via fibre 26h.

The above described symmetrical optical or fibre network comprising headend 22b, fibres 26g and 26h, splitters 25a, 25b, 25d, and 25h, and couplers 35h, 35d, 35b, and 35a, provides a network having sixteen outgoing channels split between nodes M,N,O,P, and Q, and sixteen incoming channels from these same nodes. In particular, node Q comprises eight outgoing and eight ingoing channels, node P comprises four outgoing and four ingoing channels, node O comprises two outgoing and two ingoing channels, node N comprises one outgoing and one ingoing channel and similarly node M comprises one outgoing and one ingoing channel.

As with the earlier described optical network preferably the splitters 25 and the couplers 35 are both fused fibre couplers. In practice fibres 26g and 26h are preferably implemented in a single bi-directional fibre 26, corresponding splitters 25 and couplers 35 being implemented in a single physical element.

Using the combined outgoing and incoming circuits from headends 22a and 22b, node M comprises nine incoming and outgoing channels, eight from headend 22a via splitter 23a and coupler 33a, and 1 from headend 22b via splitter 25h and coupler 35h. Similarly node N has four incoming and four outgoing channels available from headend 22a and one incoming and one outgoing channel available from headend 22b. Node O has two incoming and two outgoing channels available from headend 22a and two incoming and two outgoing channels available from headend 22b. Node P has one incoming and one outgoing channel available from headend 22a and four incoming and four outgoing channels available from headend 22b, and node Q has one incoming and one outgoing channel available from headend 22a and eight incoming and eight outgoing channels available from headend 22b.

It will of course be appreciated that a network comprising different numbers of nodes, splitters/couplers and channels could also be implemented using the inventive arrangement.

The arrangement of FIG. 4 can therefore provide a protected low cost network architecture utilising for example low cost fused fibre couplers which provides partial protection from fibre breaks. This system is particularly suited to applications in which there is a mixture of low and higher priority traffic that requires protecting as is likely in local or metro/access networks. For example at node M it may be sufficient to have the single ingoing and outgoing channels from headend 22b in the event that the signal path from headend 22a to node M is broken. In this senario the data transfer rate through the network will be lower capacity for customers connected at node M, but at least the connection will be intact allowing higher priority traffic to be carried.

While the invention has been described with reference to two headends 2a and 2b, a single physical headend could alternatively be employed having the functionality of described headends 2a and 2b.

Figure 5:
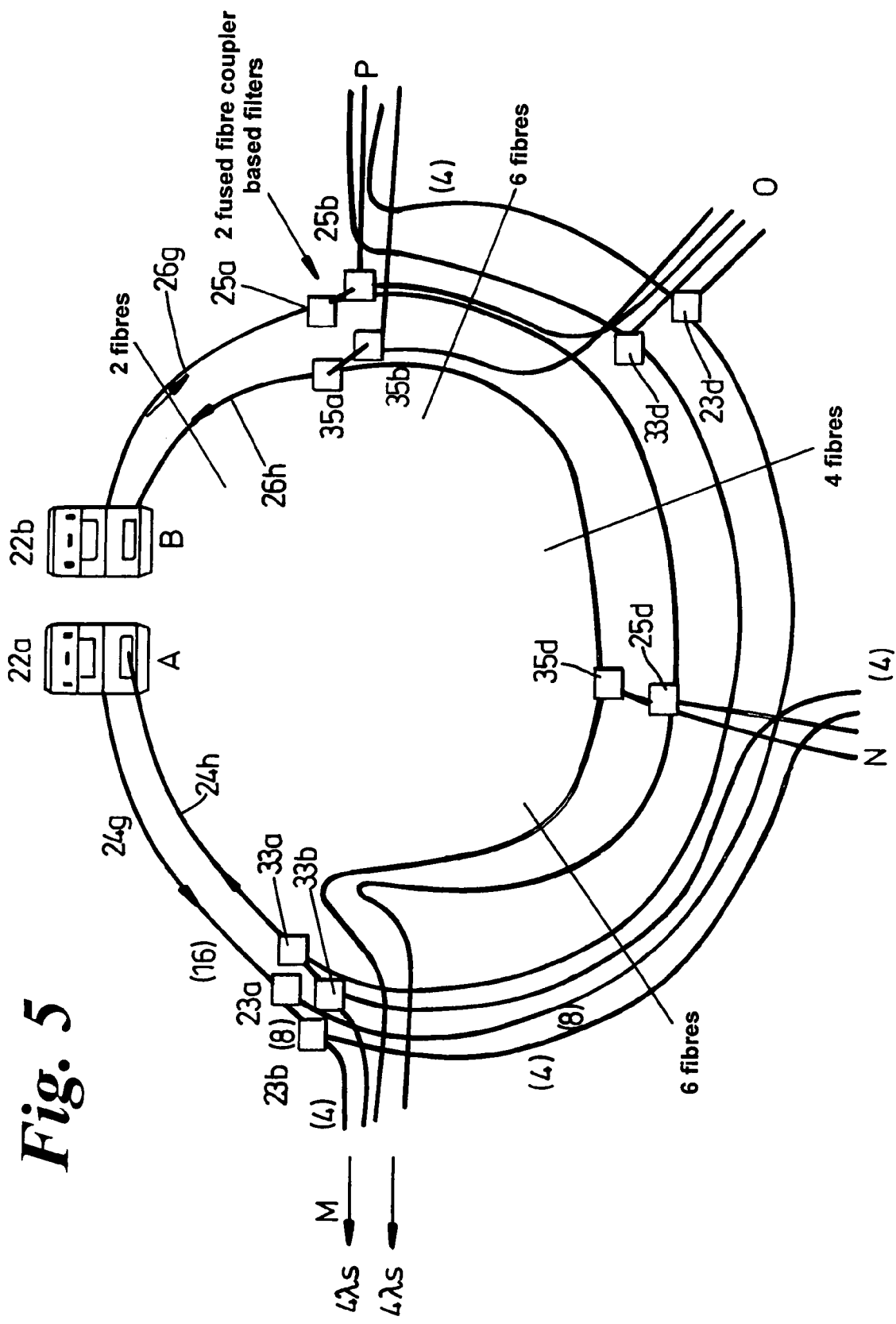
FIG. 5 shows a third preferred embodiment network architecture including protection circuit.

FIG. 5 shows a second preferred embodiment architecture, which provides an even distribution of channels at each node. In this arrangement, each of the four nodes M, N, O and P are provided with four working ingoing and outgoing channels and four protected ingoing and outgoing channels. The sixteen outgoing channels from headend 22a are split at splitter 23a, one output (eight channels) being fed directly to splitter 23b and, one output (eight channels) being fed around the fibre network to splitter 23d. One of the outputs of splitter 23b, comprising four channels, is taken off at node M, the other is fed around to node N. One, channel are output of splitter 23d containing four outgoing channels is taken off at node O, the other output of four channels being fed around the fibre network to node P. As with the architecture of FIG. 4, ingoing channels from each of the nodes M, N, O, and P are fed into couplers 33d, 33b and 33a. Unlike the arrangement of figure four, an equal number (being four) of ingoing channels is fed into headend 22a at each node.

The ingoing and outgoing circuits associated with headend 22b are arranged in a symmetrical manner as shown. Splitters 25a and 25b are co-located at node P to provide four ingoing and four outgoing channels associated with headend 22b at node P. The remaining channels are fed around the fibre network to node O and to nodes N and M via splitter 25d located at node N. A corresponding return or ingoing channel arrangement using couplers 35d, 35b and 35a is also provided as shown.

This arrangement comprises four remote nodes M, N, O, and P each having four channels added from each direction and four channels dropped from each direction. This architecture provides full fibre cut protection capability. The arrangement also has the further advantage that each channel has identical multiplexor or loss, allowing for easier fibre loss planning. The loss associated with the splitters and couplers is also relatively low compared with prior art dielectric filter networks which allows a corresponding passive network to be physically larger. This arrangement also offers a relatively low cost network. This is particularly important for metro/access network applications.

Figure 6:
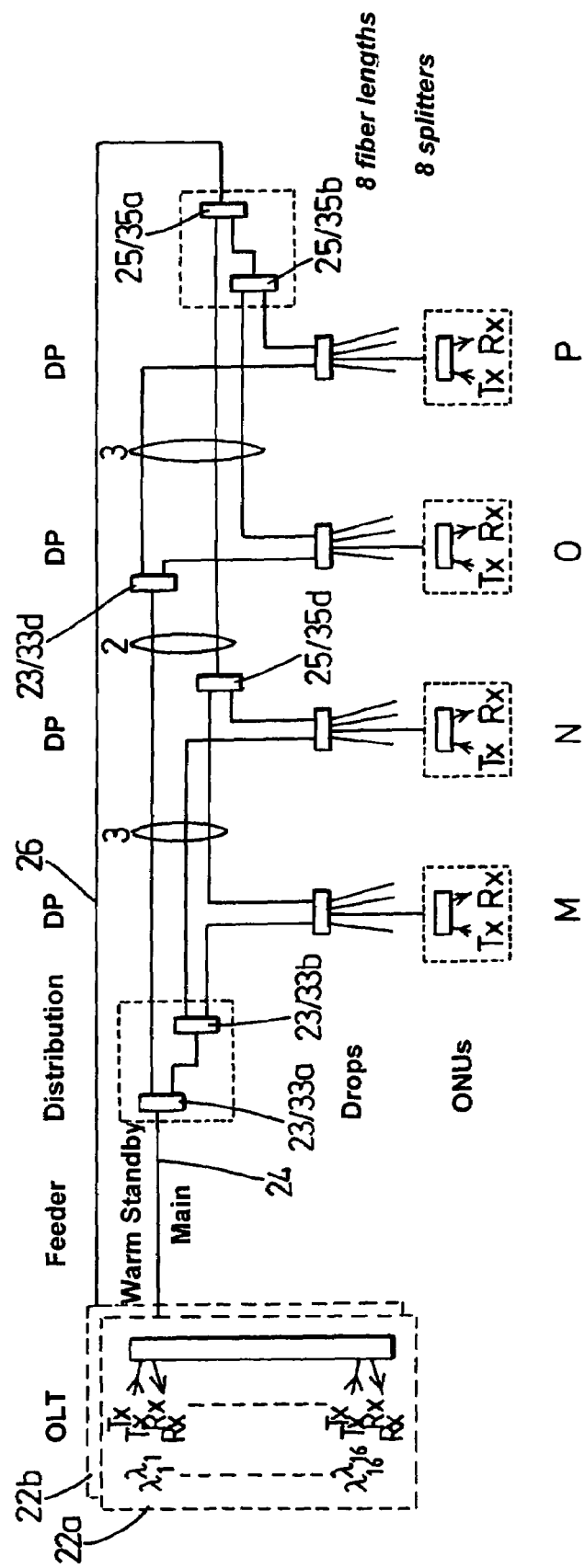
FIG. 6 shows the network of FIG. 4 implemented as an access network.

The improved or alternative network architecture described herein is also applicable to access networks including Fibre to the Home (FTTH) networks. As businesses in particular and other end users become more dependant on data links, there is an increased need for protection for these links. Typically access networks have had tree architectures which are relatively cheap but offer no protection. The inventive architectures described above can be applied to the access space to increase the level of protection without the need for installing expensive standard ring architectures. FIG. 6 shows the architecture of FIG. 5 applied to an access network situation. The downstream (24g and 26g) and upstream (24h and 26h) paths on each ring 24 and 26 have been shown as single fibres 24 and 26. Splitters and couplers have also be shown combined for example 23/33a, which is co-located with 23/33b. Each of the nodes M, N, O and P has connection to each ring 24 and 26. Typically each node will comprise time division multiplexers and demultiplexers for extracting time divided channels from each optical wavelength. The nodes may be large business customers or a suburban street for example.

The network architectures according to the present invention provide improved reach over more traditional ring type architectures which provide greater flexibility at the expense of reach. The inventive architecture is particularly suited to access and metro access networks where reach is the more important factor.

While the invention has been described with respect to fibre networks, other optical networks could also be used for example free space optical networks utilising waveguides.

The present invention has been described with reference to preferred embodiments there of. Alterations and modifications as would be obvious to a person skilled in the art are intended to be incorporated within the scope here of.

What is claimed is:

1. A communications network for connecting a plurality of nodes, the network comprising:

first, second, third and fourth optical networks each arranged to be capable of carrying a respective first, second, third and fourth set of channels, said first and second sets of channels being carried in an opposite direction to said third and fourth sets of channels with respect to said nodes, said first and third optical networks each comprising a plurality of splitters serially connected by optical waveguides such that an output port of one of said respective splitters is connected to an input port of another of said respective splitters, and wherein a non-serially connected output port of one of said splitters forms an output of one of said nodes;

said second and fourth optical networks each comprising a plurality of couplers serially connected by optical waveguides such that an output port of one of said respective couplers is connected to ad input port of another of said respective couplers, and wherein a non-serially connected input port of one of said respective couplers forms an input of one of said nodes.

2. A communications network according to claim 1, wherein said output of one of said nodes and said input of one of said nodes are an output and input of the same node.

3. A communications network according to claim 1, wherein at least one of said nodes comprises outputs formed from non-serially connected output ports of respective splitters of said first and third optical networks.

4. A communications network according to claim 3, wherein said at least one of said nodes further comprises inputs formed from non-serially connected input paths of respective couplers of said second and fourth optical networks.

5. A communications network according to claim 1, wherein said splitters and couplers are periodic interleaving filters.

6. A communications network according to claim 5, wherein said periodic interleaving filters are fused fibre splitters or couplers.

7. A communications network according to claim 1, wherein said splitters and couplers are respectively arranged to split and couple channels equally between outputs and inputs.

8. A method of operating a communications network for connecting a plurality of nodes, the network comprising:

first, second, third and fourth optical networks each arranged to be capable of carrying a respective first, second, third and fourth set of channels, said first and second sets of channels being carried in an opposite direction to said third and fourth sets of channels with respect to said nodes, said first and third optical networks each comprising a plurality of splitters serially connected by optical waveguides such that an output port of one of said respective splitters is connected to an input port of another of said respective splitters, and wherein a non-serially connected output port of one of said splitters forms an output of one of said nodes;

said second and fourth optical networks each comprising a plurality of couplers serially connected by optical waveguides such that an output port of one of said respective couplers is connected to an input port of another of said respective couplers, and wherein a non-serially connected input port of one of said respective couplers forms an input of one of said nodes.

* * * * *